Figure 1:
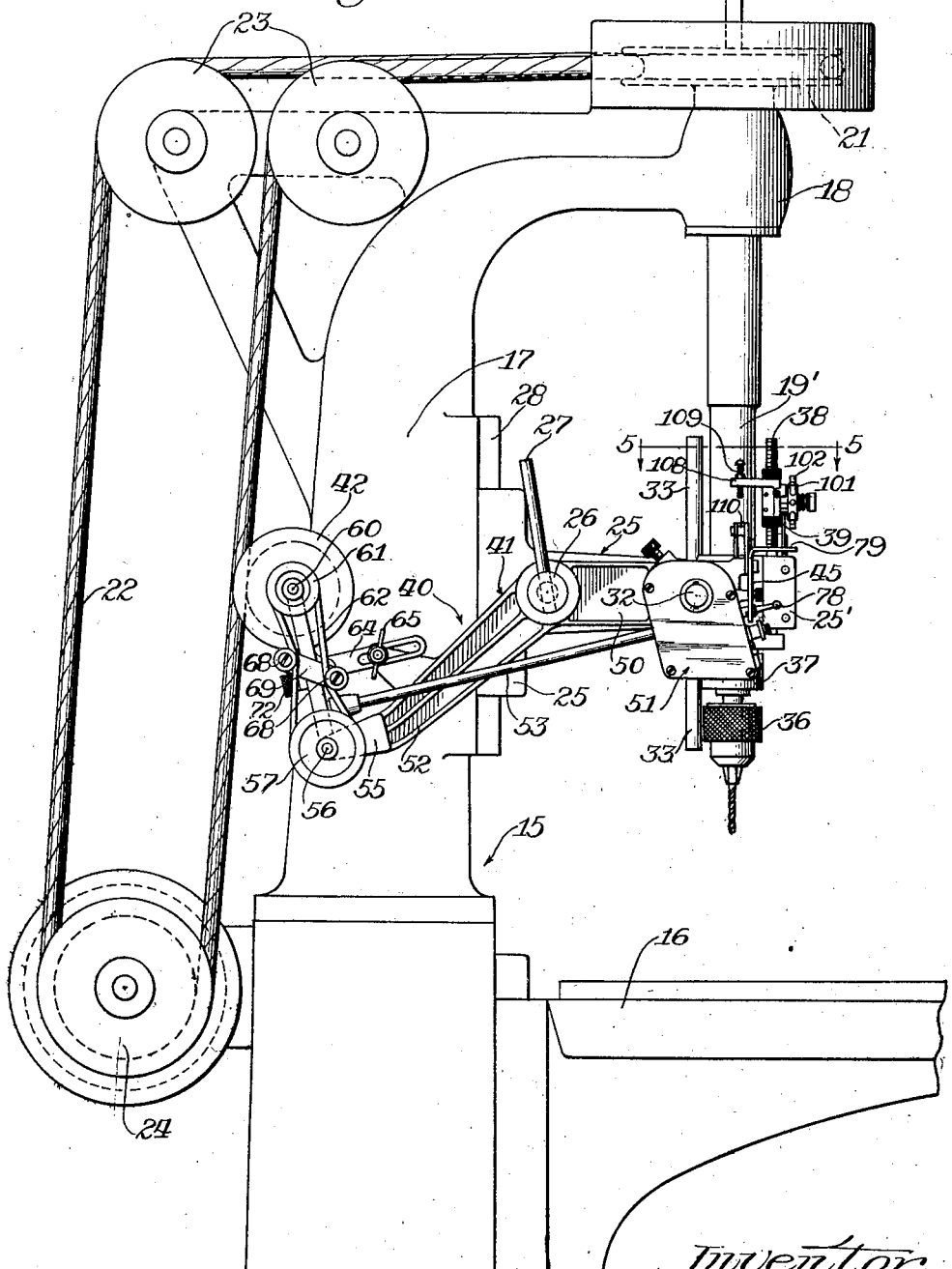

March 16, 1926.

G. HOFMANN 1,576,509

FEED ATTACHMENT FOR DRILL PRESSES

Filed Nov. 29, 1922    4 Sheets-Sheet 1

Inventor
George Hofmann.
By Rector Hibben Davis & Macauley
Attys

March 16, 1926.  1,576,509
G. HOFMANN
FEED ATTACHMENT FOR DRILL PRESSES
Filed Nov. 29, 1922    4 Sheets-Sheet 2
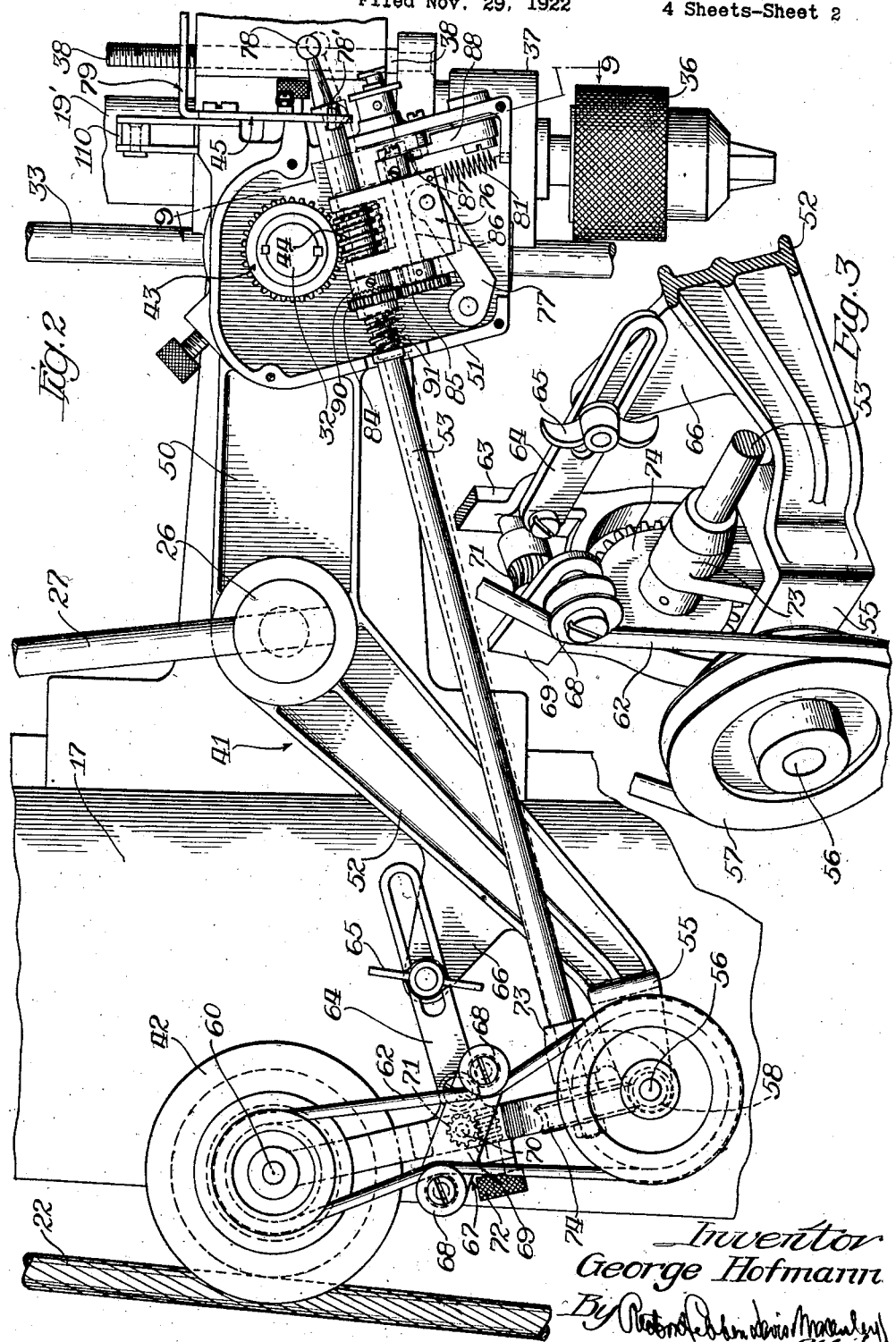
Inventor
George Hofmann March 16, 1926.
G. HOFMANN
1,576,509
FEED ATTACHMENT FOR DRILL PRESSES
Filed Nov. 29, 1922 4 Sheets-Sheet 3
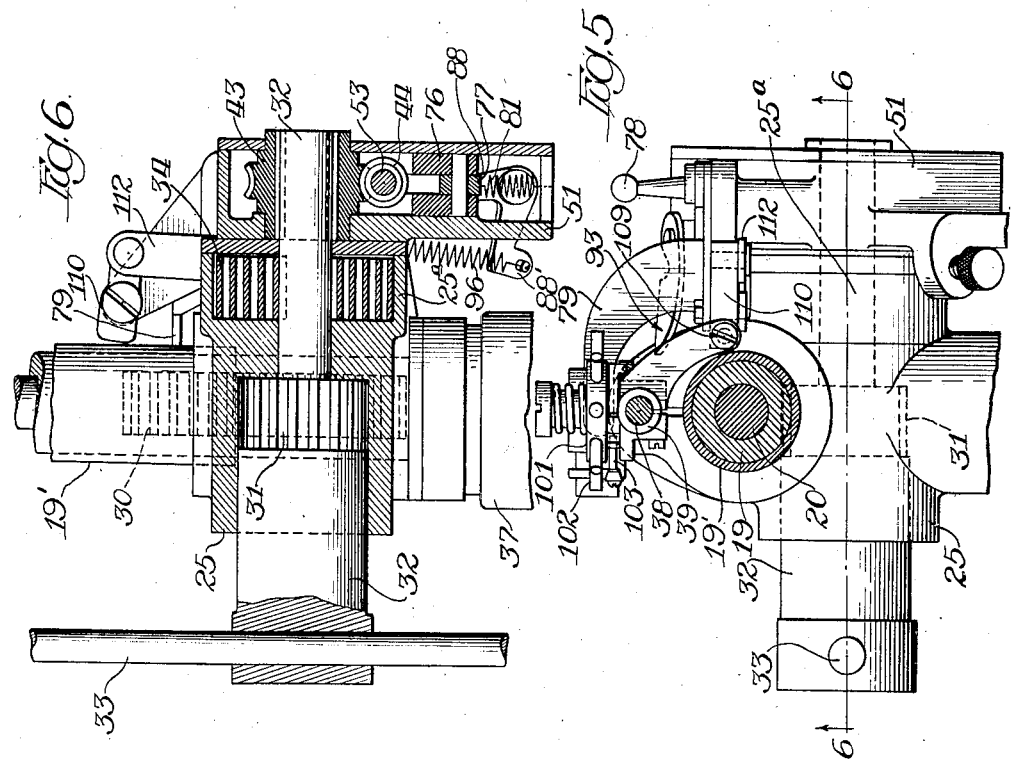
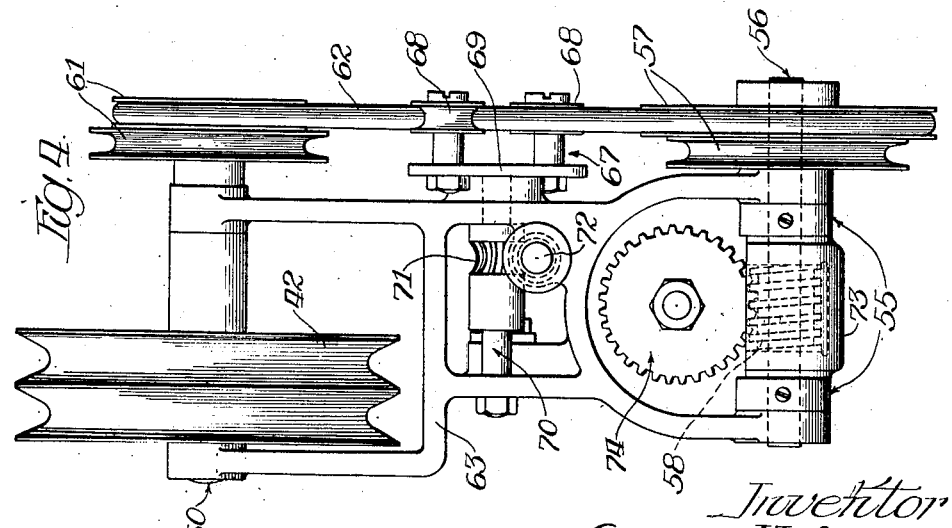
Inventor
George Hofmann, March 16, 1926.
G. HOFMANN
1,576,509
FEED ATTACHMENT FOR DRILL PRESSES
Filed Nov. 29, 1922
4 Sheets-Sheet 4
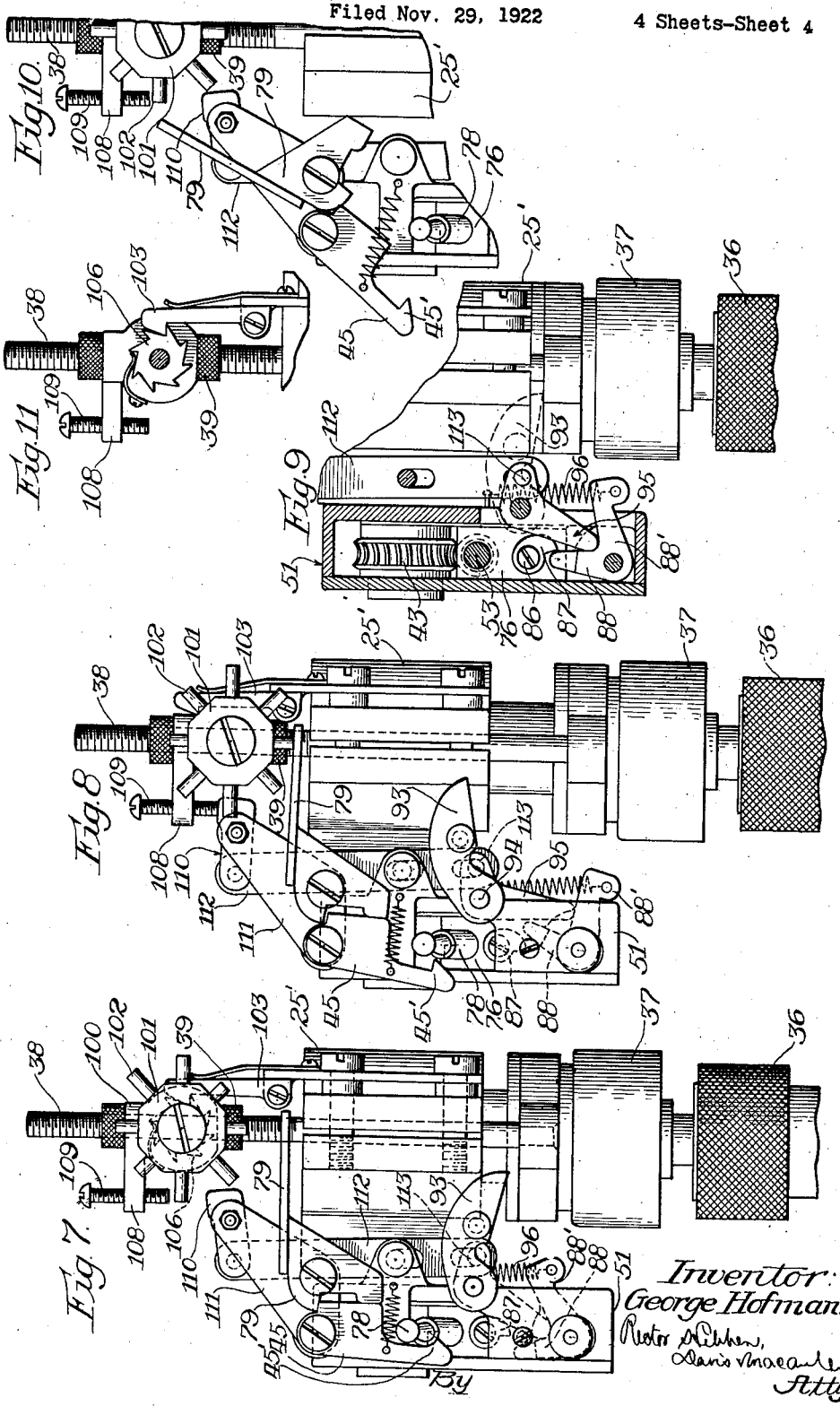
Inventor:
George Hofmann Patented Mar. 16, 1926.

1,576,509

UNITED STATES PATENT OFFICE.

GEORGE HOFMANN, OF CHICAGO, ILLINOIS.

FEED ATTACHMENT FOR DRILL PRESSES.

Application filed November 29, 1922. Serial No. 603,921.

*To all whom it may concern:*

Be it known that I, GEORGE HOFMANN, a citizen of the United States, residing at Chicago, in the county of Cook and State of Illinois, have invented certain new and useful Improvements in Feed Attachments for Drill Presses, of which the following is a specification.

Drill presses are well known and widely used, in which the tool-carrying spindle is vertically fed downwardly toward the work by hand, such feed being against the tension of a return spring which, when the hand pressure is relieved, raises the spindle to idling position. The wearying strain on the operator, and irregularity of hand-imposed pressure are both conducive to production far below the best capacity of the machine.

The general object of my invention is to provide a feed-attachment (applicable, with only changes of detail construction consistent with design-differences in the primary drill press structures, to many makes of such marketed drill presses) to enable the spindle to be power-fed toward the work and automatically released for spring-return at the end of its downward excursion. A further object of my invention is so to construct the attachment that it may be readily thrown out of operation at will, leaving the drill press subject only to hand-impelled feed. Another object of the invention is to provide construction in which the power feeding action upon, and the spring restoration of, the drill spindle may be of automatic and continuous recurrence, so that the operator need only place the pieces of work in position between recurrent reciprocations of the spindle. A further object of the invention is to provide in the attachment means for causing successive feeding operations, automatically effected, to be of predeterminedly different extent, so that drilling to a given depth will be effected in several distinct excursions of the tool, as is highly desirable in some classes of work.

In principle some of the functions performed by this attachment have heretofore been effected in rather complicated and expensive machines in which the acting parts are initially built in; but I believe that I am the first to provide an attachment as claimed, which can readily be shifted from one machine to another and which gives to the attachment-equipped machine the advantages of either manual, semi-automatic, wholly automatic, or predeterminedly-graduated operation at the will of the operator.

Other and further objects of my invention are to provide such an attachment of a construction that is simple, efficacious, rugged, easily handled for quick application to any machine that its attaching parts may fit, and available for use either on a single-spindle or a multiple-spindle drill press; and still other objects will become apparent to those skilled in the art from the following description.

In the accompanying drawings, wherein I have shown a single embodiment of my invention in a form detailed especially for use with well-known make of sensitive drill press, Fig. 1 is a side elevation of the drill press equipped with my attachment; Fig. 2 is an enlarged view of the attachment in place, with its cover plate removed; Fig. 3 is a perspective detail of a portion of the frame and gearing of the attachment; Fig. 4 is a rear elevation of the attachment; Fig. 5 is a section on line 5—5 of Fig. 1; Fig. 6 is a section on line 6—6 of Fig. 5; Fig. 7 is a front end elevation of the attachment; Fig. 8 is a similar view showing the parts in a different position; Fig. 9 is a fragmentary detail showing some parts in section on line 9—9 of Fig. 2; Fig. 10 is a fragmentary view showing a different position of some of the parts illustrated in Figs. 7 and 8 and Fig. 11 is a fragmentary section showing some of the parts illustrated in dotted lines in Fig. 7.

It will be understood that while I have illustrated, for full disclosure, only a single embodiment of my invention, many changes in construction and arrangement of the parts may be made, as in adapting the attachment to other makes of drill presses and in otherwise varying the particulars of embodiment, without departure from the spirit of my invention and within the scope of appended claims.

The drill press 15 to which my attachment is shown as applied provides a suitable work table 16 above which rises the standard 17 terminating in the overhanging arm 18 in which is mounted the telescopic sleeve 19—19' through which passes the vertically disposed drill spindle 20. In any suitable fashion, well known in the art, the drill spindle is mounted to rotate in but to move axially with the lower section 19' of the sleeve, the spindle being rotated, whatever its vertical position may be, by a pulley 21 through which the upper end of the spindle slides, this pulley being driven as by the belt 22 which runs from the pulley back over idler pulleys 23 and down the rear of the machine to a main drive pulley 24, so that one vertically extending course of the belt is available (in this particular instance) as a constantly running power-source from which the power driven parts of the attachment may be operated. Any constantly running part that is conveniently located may be used as the power-source. The lower section 19' of the spindle sleeve is vertically slidable but non-rotatable in a lateral arm 25 of the frame, this arm being vertically adjustable in any usual fashion to determine the normal elevation of the sleeve section 19' and spindle 20 above the work table, and on this adjustable arm is mounted the usual hand-operated feed mechanism for the spindle. In the construction specifically shown a lock-operating stud 26 is provided on the arm 25, and equipped with a hand lever 27 for enabling the arm to be locked in any vertical position on its slide-way 28, (this being one commonplace form of construction in drill presses and needing no specific description) and the presence of such a stud 26, or any generally kindred projection from the arm 25 may be taken advantage of by using it as a convenient supporting means or attaching point for one portion of the frame of the power-attachment to be described. Further, in the particular drill press illustrated, the normal, hand-operated feed mechanism works upon sleeve section 19' which has provided thereon a rack 30 engaged by a spur gear 31 on the shaft 32, which shaft extends transversely through suitable bearings in the arm 25, one end of said shaft (of larger diameter) being provided with a hand-lever 33 for effecting the manual feed, and the other end of the shaft (of smaller diameter) having connection with one end of a coiled return spring 34 the other end of which is connected to the spring housing and head 25ª that forms a portion of the arm structure 25. Obviously when lever 33 is properly turned, sleeve section 19' is fed downwardly, carrying with it the drill spindle; and when the hand pressure is relieved the return spring 34 acts on shaft 32 to restore the sleeve and spindle to raised position. Further, as commonplace construction already present in various well-known drill presses the tool-chuck 36 on the spindle-end is arranged below a collar 37 of the sliding sleeve, and this collar (or other suitable attachment to the sleeve) carries a screw-threaded stop-stem 38 which slides through an aperture in the head-end 25' of arm 25 and which carries a vertically adjustable stop-nut 39. The obvious function of this stop construction in the ordinary drill press is to give a maximum-depth adjustment or a limit of the downward excursion of the spindle, which cannot be depressed below the point where the stop will strike upon the upper surface of the head 25'.

It will be understood that in details of shape and arrangement of parts, from the power driving mechanism to the drill-chuck, different makes of drill presses develop minor variations from the specific construction herein shown, but that in specific designs of my attachment these minor variation may readily be taken care of without departure from the principles of my invention. For one instance, in many makes of drill presses the feed-actuating shaft 32 has an end structure, projecting beyond the spring-housing, of such form as to require no change to facilitate the application of my attachment; in other drill presses a new shaft or a shaft-extension would have to be supplied to give a properly formed end; and so on.

In general my attachment, 40, is preferably a self-contained unit having a frame 41 that may be readily mounted upon and demounted from the arm 25 of the drill press, this frame 41 carrying power-transmitting mechanism adapted to take power from the constantly running belt 22, (as in this instance by engagement with a grooved wheel 42 with said belt) and to deliver power to the spring-returned actuating shaft 32, (power-delivery being effected, in this instance, through a worm wheel 43 that is suitably attached to, but readily removable from, the smaller end of shaft 32) there being in the power-transmitting connections of the attachment a breakable connection (in the specific illustration the connection between worm wheel 43 and its worm 44) which connection is controlled by a trigger (such as part 45,) that can be tripped from the stop-stem 38 of the drill press. Thus, in the simplest operation of the power feed mechanism, the attachment will deliver power from machine belt 22 to spindle-actuating shaft 32 for depressing the spindle until the part carried by the stop-stem 38 strikes the trigger 45 and then the power-transmitting train will be broken to permit the coiled spring 34 to restore the spindle to raised position. The broken connection may be manually reestablished, making the device work semi-automatically. Further, the self-contained mechanism shown includes automatic devices (in this instance a cam 87) that, after the spring-restoration of the spindle as last described, will reestablish the just broken power-transmitting connection, without manual intervention, so as to cause another descent of the spindle, thus making the attachment one which, wholly automatically causes recurrent feed-excursions of the spindle. And, as further shown, these mechanisms may be supplemented with successively operating stop devices, (part of which, such as stop-wheel 101, will be mounted on the stop-stem 38, rather than self-contained in the attachment,) for causing a predetermined number of successive feed-operations to be of different effective ranges, this selectively-variable operation enabling the drilling of a single hole to be done in a plurality of stages by the automatic functioning of the device.

In the particular construction shown frame 41 is a casting having a body portion 50 shaped to lie alongside of the drill press arm 25 and to be removably attached thereto, preferably at two points near its opposite ends, this body having at its forward end a head or gear-casing 51 for carrying the automatic trip mechanism, and said body finding extension in a tail-piece 52 which extends toward the rear of the drill press to carry the power-receptive wheel 42 and portions of the power-transmitting mechanism of the attachment. This frame, in many drill presses, is most conveniently supported by engaging a suitable hole in the rear end of the body 50 with the stud 26, and engaging the front end of the body with the shaft 32, thus positioning the attachment with the perfect precision on the adjustable arm 25 of the machine. In the construction shown the hub of worm wheel 43 bears in the sides of head 51 and such wheel is splined on shaft 32. Power taken from belt 22 by the wheel 42 is transmitted to the rear end of a line shaft 53 of the attachment, which shaft carries at its forward end the worm 44 heretofore referred to; but while the line shaft 53 has a definite position in the frame, the belt-wheel 42 may have to be displaced through quite a range of movement according to location and tightness of belt 22, and for this reason I provide the construction particularly illustrated in Figs. 2, 3 and 4. Tail piece 52 terminates in a yoke 55 that carries transverse shaft 56 on which are mounted the pulley-wheel set 57 and a worm 58. Belt-wheel 42 is mounted on the same shaft 60 with pulley-wheel set 61 which, through belt 62, may drive the appropriate pulley-wheel of set 57. This shaft 60 is mounted in the upper portion of a frame member 63 which is pivoted at its lower end on shaft 56, so that such member is oscillatable toward and from the belt 22 without affecting the drive from shaft 60 to shaft 56; the frame being adapted to be secured in adjusted position by means of a slotted link 64 pivoted to the frame and having its slotted end arranged to be clamped by a wing-nut 65 on a lug 66 of tail-piece 52. Of course, for varying the speed at which line shaft 53 will be driven the pulley sets 57 and 61 may be made in complemental steps of any desired number, and for maintaining tension on belt 62 a belt tightener 67 may be provided on the frame member. The belt-tightening construction shown provides a pair of tightener-rollers 68 on a cross-bar 69 fixed to a shaft 70 that may be turned, and held in adjusted position, by a worm and worm-wheel coupling 71 actuated by a finger piece 72.

In order that the forward end of line-shaft 53 may be vertically displaced to make and break the gear-connection 44—43, and for supporting the rear end of the line shaft 53, a bearing block 73 is pivoted on the shaft 56, and in rear of this block a worm-wheel 74 on shaft 53 meshes with worm 58. The gear reduction may be made to drive the line-shaft 73 in any desired ratio to the speed of spindle-rotation.

At its forward end shaft 53 enters the head-structure 51 and is there supported for limited vertical displacement in a bearing block 76, which block is guided in movement by a swinging link 77, and has a projecting finger piece 78 extending forwardly through the front end of the head for convenient accessibility. In such finger piece there is a notch 78' to be engaged by the nose 45' of the stated trigger 45. A trip-lever 79, pivoted on the front of the head 51, projects into the path of a stop part on stop-stem 38, and when struck thereby, forces the trigger 45 out of engagement with the finger-piece 78, whereupon the bearing block 76 for the shaft will be pulled down (to dotted line position in Fig. 2) by the small spring 81, thus breaking the driving connection of worm 44 with worm wheel 43 and freeing the spindle 20 and sleeve 19' for spring restoration. For semi-automatic operation, the line-shaft 53 need only be left in its lowered position until the operator manually raises the finger-piece 78 to restore it to trigger-latched position.

For fully automatic operation, with constant recurrence of spindle descent, provision is made for automatically raising the line shaft 53 from dotted line position to full line position, Fig. 2, as by a cam-mechanism. On the line-shaft the small spur gear 84, meshing with a corresponding gear 85 therebelow, drives the stub shaft 86 which carries a single-point cam 87 with a curved active face. Within the head is a cam-abutment piece 88 which, when in the position shown in Fig. 7, stands with its upper end so positioned that it is in the path of rotation of the cam projection when the line-shaft 53 and cam-shaft 86 are in lowered position. When wholly automatic operation of the attachment, merely for constantly recurrent uniform excursion of the spindle is desired, this abutment will be permanently positioned so as to intercept the lowered cam. Of course the line-shaft continues to rotate while in its lowered position, and its rotation is constantly transmitted to the cam-shaft 86. Therefore, given an adjustment of parts such that the trigger 45 is tripped just after the cam projection 87 has passed the end of the cam-abutment 88, the spring restoration of the drill spindle will occur as heretofore described and shaft 53 will make nearly a complete rotation before the cam approaches the abutment. Of course, when the cam strikes the abutment its curved face raises it bodily, as it slips over the receptive end of the abutment, thereby lifting the bearing block and line-shaft back to initial position, where the bearing block for the line-shaft will be again latched by the trigger 45. Of course the worm wheel 43 always comes to definite position when the spindle is spring restored, and the worm 44 is always in a definite position when the cam 87 raises the shaft 53; but for initial adjustment to insure smooth mesh between the worm and worm-wheel under this automatic operation, the cam should be readily adjustable angularly to vary its relation to the worm 44. To this end I make gear wheel 84 rotatively adjustable relative to the worm 44. The gear-hub and a collar 90 on the shaft 53 form a toothed clutch, and a spring 91 interposed between the hub of the gear and a coller on the shaft 53 normally forces the clutch into mesh. By pressing the wheel 84 rearwardly on the shaft to disengage the clutch surfaces, the wheel 84 may be turned, for cam-adjustment, without turning the shaft 53 or worm 44.

It is desirable that the automatic, constantly recurring action above described may be discontinued at the will of the operator, by manually throwing the cam-abutment 88 to position where it may not co-act at all with the cam. A transversely-extending finger lever 93 on the front end of the gear casing is connected to the shaft 94 of a bell-crank lever 95, the bottom arm of which works upon the lower arm 88′ of the bell-crank lever, the upwardly extending arm 88 of which constitutes the cam-abutment. A spring 96 tends constantly to throw the cam-abutment into its functioning position but, as shown in Fig. 8, when the finger lever 93 is raised it depresses and locks down the arm 88′, so throwing the cam-abutment out of the path of the cam and preventing cam-actuated reestablishment of the broken-driving connection.

In order most effectively to secure a multiple-stage feed of the drill spindle, so that the spindle, on a plurality of excursions will descend to progressively greater depth, it is desirable to employ the automatic restoration after each descent of the spindle until the desired maximum depth is reached. In some instances it is desirable then to prevent automatic restoration of the driving connections, leaving the machine to idle until it is manually started again; in other instances the automatic cycle should be continued. To accomplish this the stop-stem 38 may be provided with a plurality of stop-projections of different lengths to strike the trip-lever 79 when the spindle is at different heights, and these stops should be brought into play successively on respective descents of the spindle, the cam-abutment 88 meanwhile remaining positioned for its automatic operation. Then, if it be desired to stop the automatic cycle when the spindle makes its last descent to greatest depth, not only should the trip lever 79 be actuated, but the cam-abutment should be thrown to its ineffective position. Mechanism provided to these ends will be readily understood by reference to Figs. 7 to 11. On the stop-stem 38 is mounted a frame 100 carrying a stop-wheel 101 from which project a series of pins 102 of different lengths, any of which may, when directed straight downwardly, strike the trip lever 79. Of course the pin lengths may be made of any desired relativity and succession, and the pins may be made readily replaceable. After each descent of the spindle, carrying with it this stop-wheel, such wheel 101 is given a rotative displacement equal to the spacing between two pins. A pawl 103 fast on the head member 25′ of the press-arm co-acts with ratchet 106 secured to the wheel 101, so that the wheel is turned step-by-step each time the stop-stem 38 rises. Manifestly this provides for successive trippings of the trigger 45 at different heights of the spindle. With this provision only, the multiple stage drilling would occur, but in repeated sequence without cessation, and the machine may be so worked. Also, by detaching pawl 103 any selected stop pin may be constantly used. If desired, however, the cam-abutment 88 may be thrown to ineffective position when the spindle makes its descent to lowest drilling position. Frame 100 has an arm 108 carrying an adjustable stop-screw 109 that, as shown in Fig. 8, may strike a lever 110 pivoted in a rigid bracket 111 of the attachment-frame. This lever 108 operates a link 112 the lower end of which has slot and pin connection as at 113 with the bell-crank lever 95, so that screw 109 striking on lever 110 has the same substantial effect as does the lifting of finger-lever 93; i. e., it throws the cam-abutment 88 to the inoperative position shown in Fig. 8, thereby to leave the line-shaft 53 idling in dropped position, and allowing the machine to idle until the said line-shaft is manually raised for the recommencement of automatic operation. Manifestly by retracting the screw 109 it is rendered inoperative and manifestly, too, by reason of the slot and pin connection 113 the link 112 does not interfere with the manual raising of finger-lever 93.

In résumé of operation, worm-gearing 43—44 forms a breakable power-connection, breakable by dropping of shaft 53 whenever trigger 45 is tripped by descent of the drill spindle to predetermined depth; so to permit spring-restoration of the spindle to raised position. Finger-piece 78 facilitates manual restoration of the power connection. For automatic restoration of said power connection a cam 87, constantly driven from the line-shaft 53 strikes the cam-abutment 88, after shaft 53 has dropped, such cam raising the shaft 53 again so that latch 45 may reengage. But this cam-abutment 88 may be thrown to and locked in inoperative position at will by means of finger-lever 93, making the restoration of the broken power connection require manual action. The step-by-step ratcheted stop-wheel 101 may trip the trigger 45 at progressively varying descents of the spindle and if desired, on the deepest stage or lowest descent, the stop 109 may be caused to throw finger-lever 113 as shown in Fig. 8, thereby making the progressive-cycle an automatic one, but the starting of another cycle a manual operation.

I claim:

1. In a power-feed attachment, for a normally-manual drill-press that provides a frame, a driving element, a spindle driven in rotation therefrom, manual means for feeding the spindle vertically which includes a feed shaft, spring means to return the spindle to raised position, and stop means movable vertically by and with the spindle; the combination with an attaching-frame having provision for ready attachment to the drill-press frame, of power-receiving means on said attaching frame adapted and arranged to coact with said driving element of the drill-press, power-delivering means mounted in said attachment frame and adapted and arranged to coact with said feed shaft of the drill press to rotate the latter, power-transmission means intervening between said power receiving means and power delivering means and including a breakable power connection, and trip means controlling the breaking of said power connection, carried by said attachment frame and having a part adapted and arranged for interposition in the path of vertical movement of said stop means of the drill press to be actuated by the latter on its down-stroke.

2. In a power-feed attachment, for a normally-manual drill press that provides a frame with a lateral arm, a driving element, a spindle driven in rotation therefrom and extending through said lateral arm, manual means for feeding the spindle vertically toward the work including a feed-shaft mounted in said arm and stop-means movable with said spindle; the combination of an attaching frame having provision for ready attachment to the lateral arm of said drill-press frame and arranged to extend along side thereof, and parts assembled on and carried by said attaching frame comprising power-receiving means to coact with said driving element, power-delivering means to coact with said feed-shaft, intervening power-transmission means including a line shaft extending substantially horizontally along said attachment frame and mounted for vertical displacement of its end that is adjacent to said power-delivering means and having provision at that end for power-connection with said power-delivering means which connection is breakable by vertical displacement of said end of the shaft, and means for latching said shaft against such displacement having an unlatching trigger adapted and arranged for interposition in the path of movement of said stop means of said drill-press.

3. In a power-feed attachment, for a normally-manual drill-press that provides a frame, a driving element, a spindle driven in rotation therefrom, manual means for feeding said spindle vertically downward toward the work including a feed-shaft, spring means to return the spindle and stop means movable vertically by and with the spindle; the combination of an attaching frame having provision for ready attachment to the drill-press frame, and parts carried by said attaching frame as a self-contained assembly, comprising power-receiving means adapted and arranged to coact with said driving element, a power-delivering gear adapted and arranged to coact with said feed shaft, intervening power-transmission means therebetween including a line-shaft mounted for vertical displacement of an end thereof and adjacent said end carrying a displaceable gear arranged to engage or disengage said power-delivering gear as said end of said line shaft is vertically moved respectively upwardly or downwardly, latch means for holding said line shaft in its power-transmission position, and a trigger for tripping said latch means having a part adapted and arranged for interposition in the path of said stop means to be actuated by downward movement of said stop.

4. In an attachment of the character described for drill-presses, the combination of an attachment frame providing an arm having provision for ready attachment to a lateral arm of a drill-press, and parts assembled on said frame as a self-contained attachment mechanism, comprising a power-delivering gear member, a complemental transmission-gear member, a line-shaft carrying the latter and having its gear-carrying end movable toward and from said power-delivering gear and its opposite end pivotally mounted to permit such movement, power-receiving means operatively connected with said pivoted end of said shaft, and trip-means adapted and arranged to latch the gear-carrying end of said shaft in position to engage its gear with said power-delivering gear.

5. In an attachment of the character described for drill-presses, the combination of an assembly frame having provision for ready attachment to a drill-press frame, and parts carried thereby constituting a self-contained attachment mechanism and comprising a power-receiving member adapted and arranged to be constantly actuated from the drill-press, a power-delivery member adapted and arranged for connection with the drill-press feed-shaft, power-transmission means between said members including a line-shaft adapted and arranged to be constantly rotated by said power-receiving member, a breakable connection between said line-shaft and said power-delivering member, trip-means for breaking said connection, and means operated from said line-shaft for automatically re-establishing said breakable connection.

6. In an attachment of the character described for drill-presses, the combination of an assembly frame having provision for ready attachment to a drill-press frame, and parts carried thereby constituting a self-contained attachment mechanism and comprising a power-receiving member adapted and arranged to be constantly actuated from the drill-press, a power-delivery member adapted and arranged for connection with the drill-press feed-shaft, power-transmission means between said members including a line-shaft adapted and arranged to be constantly rotated by said power-receiving member, a breakable connection between said line-shaft and said power-delivering member, trip-means for breaking said connection, means operated from said line-shaft for automatically re-establishing said breakable connection, and manually-controlled means for rendering inoperative at will said means for re-establishing said connection.

7. In an attachment of the character described for drill-presses, the combination of an assembly frame having provision for ready attachment to a drill-press frame, and parts carried thereby constituting a self-contained attachment mechanism and comprising a power-receiving member adapted and arranged to be constantly actuated from the drill-press, a power-delivery member adapted and arranged for connection with the drill-press feed-shaft, power-transmission means between said members including a line-shaft adapted and arranged to be constantly rotated by said power-receiving member, a breakable connection between said line-shaft and said power-delivering member, trip-means for breaking said connection, and means comprising a cam constantly rotatable from said line-shaft for automatically re-establishing said connection at a definite time after the breaking of said connection.

8. In an attachment of the character described for drill-presses, the combination of an assembly frame having provision for ready attachment to a drill-press frame, and parts carried thereby constituting a self-contained attachment mechanism and comprising a power-receiving member adapted and arranged to be constantly actuated from the drill-press, a power-delivery member adapted and arranged for connection with the drill-press feed-shaft, power-transmission means between said members including a line-shaft adapted and arranged to be constantly rotated by said power receiving member, a breakable connection between said line-shaft and said power-delivering member, trip-means for breaking said connection, means comprising a cam constantly rotatable from said line-shaft for automatically re-establishing said connection at a definite time after the breaking of said connection, and means for rendering inoperative at will said means for re-establishing said connection comprising a manually shiftable abutment for said cam movable into or out of position to coact with said cam.

9. The combination with a drill press that provides a frame, a driving element, a spindle driven therefrom, manual means for feeding the spindle comprising a feed shaft, and spring means to return the spindle; of a power-feed attachment comprising a frame attachable to the press-frame, power receiving means thereon to coact with said driving element, power delivering means thereon to coact with the feed-shaft, intervening power transmission means including a breakable connection, automatic means to reestablish said connection when broken, and trip means for breaking said connections; and automatically shiftable stop-means reciprocable with the spindle for actuating said trip-means on different excursions of the spindle to progressively increasing depths.

10. The combination with a drill-press that provides a frame, a driving element, a spindle driven therefrom, manual means for feeding the spindle comprising a feed-shaft, and spring means to return the spindle; of a power-feed attachment comprising a frame attachable to the press-frame, power receiving means thereon to coact with said driving element, power-delivering means thereon to coact with the feed-shaft, intervening power-transmission means including a breakable connection, automatic means to re-establish said connection when broken, and trip-means for breaking said connection; automatically shiftable stop-means reciprocable with the spindle for actuating said trip-means on different excursions of the spindle to progressively increasing depths, and means for rendering inoperative the automatic connection establishing means aforesaid.

11. The combination with a drill-press that provides a frame, a driving element, a spindle driven therefrom, manual means for feeding the spindle comprising a feed-shaft and automatic means to return the spindle; of a power-feed attachment comprising a frame attachable to the press-frame, power-receiving means thereon to coact with said driving element, power-delivering means thereon to coact with the feed shaft, intervening power-transmission means including a breakable connection, trip-means for breaking said connection, an automatically-shiftable stop-means reciprocable with the spindle for actuating said trip means on different excursions of the spindle to progressively increasing depths, automatic means to re-establish said breakable connection when broken, and disabling means for rendering inoperative said automatic connection-establishing means, said disabling means being arranged for actuation by said stop means.

12. In an attachment of the character described, a frame body, a rear frame member adjustable with respect to said body, a power-receiving wheel in said adjustable frame, a transmission shaft on said body, connections therebetween operative in any position of the adjustable frame, power delivery means carried by the frame body, a breakable connection between said delivery means and the transmission shaft, and releasable means normally maintaining said breakable connection.

13. In a unitary self-contained attachment for a normally manual drill press provided with a frame arm, an attachment frame body and spaced attaching parts arranged to secure said frame body to said frame arm, power-receiving means at one end of said attachment frame, power delivery means at the other end of said attachment frame, intervening power transmission means including a breakable connection, and latch means for normally maintaining said connection.

14. In a unitary self-contained attachment for a normally-manual drill-press provided wtih a frame arm, an attachment-frame body having apertures for coaction with two projecting parts of the drill-press frame-arm, to secure said frame body to said frame arm, and parts carried by said frame-body comprising power-receiving means at one end of said frame-body, power-delivery means at the other end of said frame-body, intervening power-transmission means including a breakable connection, and latch-means for normally maintaining said connection.

GEORGE HOFMANN.